Sept. 20, 1938.   M. S. GRAVES   2,130,390

FURRING NAIL

Filed June 30, 1936

Inventor
Mark S. Graves;
By R. S. Berry
Attorney

Patented Sept. 20, 1938

2,130,390

UNITED STATES PATENT OFFICE 2,130,390

FURRING NAIL

Mark S. Graves, Los Angeles, Calif.

Application June 30, 1936, Serial No. 88,171

1 Claim. (Cl. 72—118)

This invention relates to a furring nail and more particularly pertains to nails of the type employed in fastening woven wire of the type known as poultry wire to a supporting structure in a fashion to hold the wire in spaced relation to the surface of the structure to afford a wire reinforcement for plaster.

A type of furring nail of the above character now generally in use embodies an ordinary nail the shank of which is passed through a small block formed to serve as a spacing member to limit the extent of penetration of the nail into the structure to which it is applied; the head of the nail being adapted to engage the intersecting portions of the mesh of the wire to be fastened thereby with the wire seating on the block and thus held in spaced relation to the surface of the supporting structure.

In the manipulation of furring nails of the character above described considerable difficulty is encountered in effecting proper engagement of the wire by the heads of the nails since in stretching the wire after having effected fastening thereof with a series of the furring nails, pulling the wire free of the nail heads frequently occurs and likewise in applying plaster to the wire pressure imposed on the latter will occasionally pull the wire free of the nails.

An object of the present invention is to provide a construction in the furring nails whereby on driving the nail head against a wire to clamp the latter between the nail head and the spacing or furring block, the wire will be engaged in a fashion to securely hold it against lateral displacement relative to the nail head and thereby insure against the wire being pulled free of the nail.

Another object is to provide a furring nail of the above character in which the head of the nail is formed on the side thereof presented to a spacing or furring block through which the shank of the nail extends, with a series of protuberances spaced from each other and from the shank of the nail to provide channels in which a wire engaged by the wire head may seat, and whereby the wire will be straddled by portions of the nail in a fashion similar to that accomplished by the use of staples so that the wire will be held against withdrawal laterally from engagement with the nail head.

Another object is to provide the inner side of the nail head with projections so formed and arranged as to avoid cutting or weakening of a wire engaged thereby either on driving the nail into engagement with the wire or after the wire has been fastened in place between the nail head and the furring block.

A further object is to provide a furring nail for fastening wire netting, such as poultry wire, to a wall in such manner as to position the wire in spaced relation to the wall, which will permit a more rapid application of the netting and afford a more substantial mounting therefor than can be effected with furring nails of the kind now generally in use.

With the foregoing objects in view together with such other objects and advantages as may subsequently appear, the invention is carried into effect as illustrated by way of example in the accompanying drawing in which.

Figure 1:
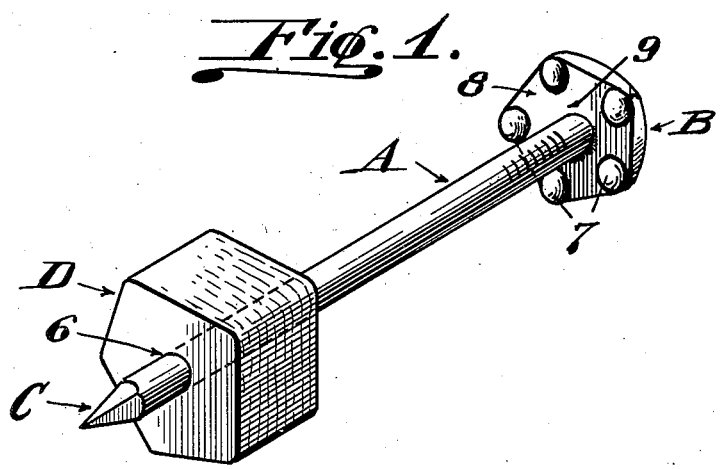
Fig. 1 is a perspective view of the furring nail as seen from the inner end thereof.

Referring to the drawing more specifically, A indicates the shank of a nail which shank is fitted at one end thereof with a head B and is formed at its other end with a penetrating point C.

While the nail may be formed in various fashions, it preferably comprises a wire nail formed in the manner common in the manufacture of wire nails.

The shank of the nail is extended through a furring block D as by driving it through the block or passing it through an opening 6 preformed in the block. The furring block D is preferably assembled on the shank of the nail previous to marketing thereof as is the usual practice in nails of this character, but it will be understood that in some instances the furring block and the nail may be marketed separately and thereafter assembled.

The furring block may be formed of any suitable material but preferably comprises a compressed fibrous material, such as paper treated with oil or wax or other suitable liquid to render the block impervious to moisture. While the furring block D may be of any suitable contour, it is preferably formed with substantially flat parallel end faces and substantially of the contour of a pentagon.

The essence of the invention resides in forming the under side of the nail head B, being the side thereof presented toward the furring block D, with a series of spaced protuberances 7 of spheroidal contour; five of such protuberances being preferably provided spaced equidistant apart and also spaced from the periphery of the shank A on centers to afford gaps 8 between adjacent protuberances to afford a continuous uninterrupted substantially flat surface 9 on the under side of the heads B encircling the shank A and extending between the latter and the protuberances 7. The centers of the protuberances 7 are spaced equidistant from the axis of the shank A and being spaced equidistant apart are thus disposed at the corners of a pentagon. The margin of the nail head is preferably in the form of a pentagon with the corners rounded at the bases of the protuberances 7. The protuberances 7 are presented toward the adjacent end face of the furring block D and within the boundary of the latter so that they may be brought to bear on or be imbedded in the block.

Figure 2:
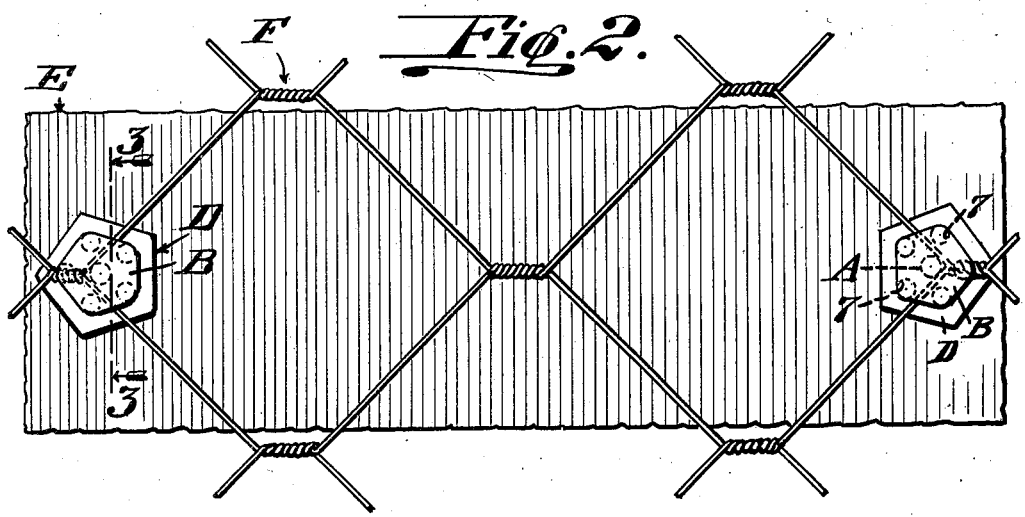
Fig. 2 is a view in elevation illustrating the manner of fastening a wire netting on a wall in spaced relation thereto by means of the furring nail shown in Fig. 1.
Figure 3:
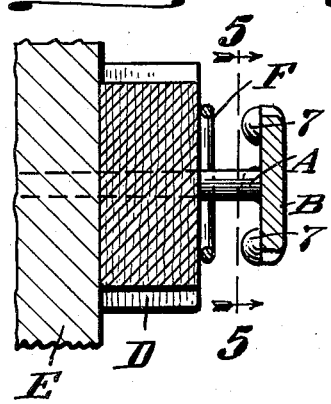
Fig. 3 is an enlarged detail in cross section and elevation as seen on the line 3—3 of Fig. 2 in the direction indicated by the arrows, showing the nail in a partially driven position.
Figure 4:
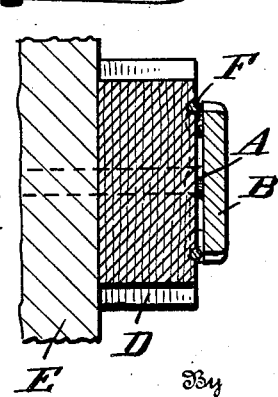
Fig. 4 is a sectional view similar to Fig. 3 showing the nail in its completely driven wire engaging position.
Figure 5:
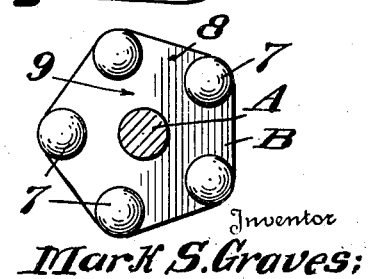
Fig. 5 is a view in section and elevation taken on the line 5—5 of Fig. 3 as seen in the direction indicated by the arrows showing the under side of the nail head.

In the application and operation of the invention the furring nails are driven into a backing wall E or other suitable supporting structure in a usual fashion with the furring blocks D seating on the surface of the wall E and with a wire mesh F seating on the furring blocks and arranged with portions of the wire lengths or strands thereof in close proximity to the shank of the nail, as particularly shown in Fig. 2. On thus positioning the wire mesh the nail is driven to bring the head thereof tightly against the wire lengths interposed between the nail head and the furring block which latter being yieldable is compressed beneath the wire engaged by the head so that such portion of the wire will be imposed on and partially imbedded in the furring block as particularly shown in Fig. 4.

On thus driving the nail head against the wire to force the latter into the yielding furring block certain of the protuberances 7 will be positioned astride one or more of the strands of the wire netting, as indicated in dotted lines in Fig. 2, the wire thus straddled by the protuberances lying in a space 8 and seating on surface 9 of the nail head in close contact with the latter.

By reason of the spheroidal contour of the protuberances 7 and their spaced relation to each other and also by the provision of at least five of the protuberances on the nail head no care need be taken in driving the nail in order to effect positioning of at least a pair of the protuberances astride a wire, and since in event a wire should happen to be positioned on the furring block such that it might initially contact a protuberance 7 to one side of the axis thereof the rounded contour of a protuberance will present an inclined face to the wire such as to exert a wedge action thereon and thereby force the wire laterally into the space between a pair of adjacent protuberances. It might occur however that a protuberance may occasionally seat directly on a wire in which event the portion of the wire so arranged will be forced deeper into the furring block but since there are at least three intersecting strands of wire at the juncture of adjacent mesh of woven wire with two of such intersecting wires diverging relative to each other, forming a crotch within which the shank of the nail is positioned, at least one of the wires will be positioned between the shank and one of the protuberances which with the inner portion of the wire imbedded in the furring block securely holds the wire against being withdrawn laterally out of engagement with the furring nail. The protuberances being rounded and the blocks being yieldable, no injury to a wire will be occasioned in event of seating of a protuberance thereon.

By thus securely engaging the wire mesh between the nail head and the furring block its accidental disengagement from the furring nail during the operation of fastening the wire mesh in spaced relation to the surface of the supporting wall is obviated, and applying of the wire mesh may be accomplished with greater facility and speed than where the ordinary furring nails are employed; furthermore the anchor of the wire mesh afforded by the protuberances 7 insure against accidental disengagement of the wire mesh from the furring nails under the strains imposed thereon in applying plaster thereto.

I claim:

In a furring nail embodying a nail formed with a shank and a head, and a solid furring block through which the shank of the nail extends having its marginal portion projecting outwardly beyond the margin of the nail head; a series of spheroidal protuberances on the side of the nail head presented toward the contiguous end face of said block; said protuberances being spaced apart relative to each other and also being spaced from the nail shank and thus being adapted to either extend alongside a wire interposed lengthwise between said head and block or to seat thereon and impress the wire into the surface of the block to hold the wire against lateral displacement relative to said block and head.

MARK S. GRAVES.